(No Model.)
J. MACPHAIL.
DRIVING WHEEL FOR HARVESTERS.
No. 552,295. Patented Dec. 31, 1895.
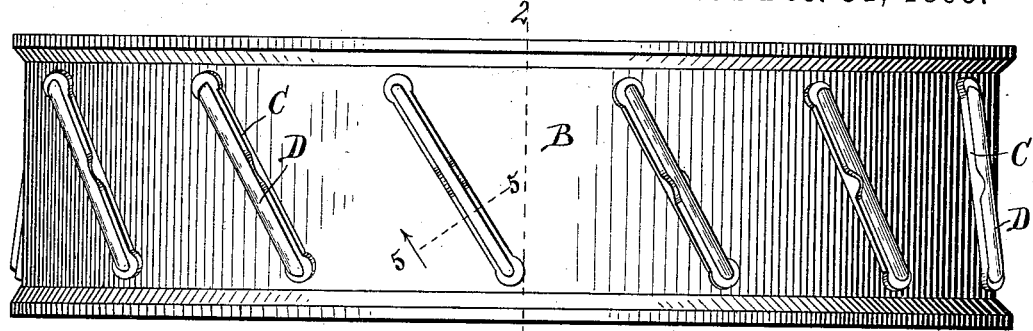
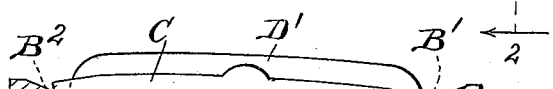
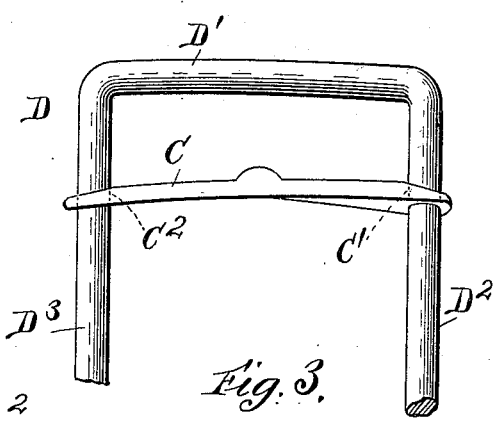
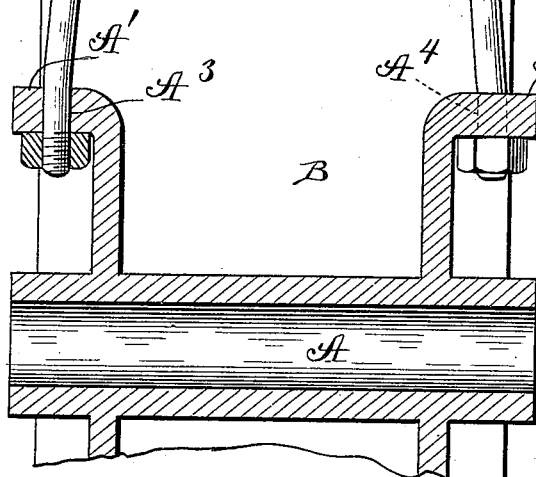
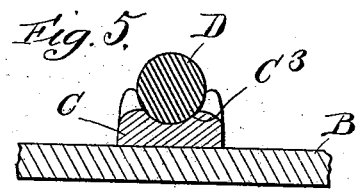
Witnesses:
W. C. Corlies
Jno. A. Christianson
Inventor:
James Macphail,
by L. L. Morrison,
Atty.

UNITED STATES PATENT OFFICE.

JAMES MACPHAIL, OF BLUE ISLAND, ASSIGNOR TO THE PLANO MANUFACTURING COMPANY, OF CHICAGO, ILLINOIS.

DRIVING-WHEEL FOR HARVESTERS.

SPECIFICATION forming part of Letters Patent No. 552,295, dated December 31, 1895.

Application filed September 11, 1895. Serial No. 562,225. (No model.)

*To all whom it may concern:*

Be it known that I, JAMES MACPHAIL, a citizen of the United States, residing at Blue Island, in the county of Cook and State of Illinois, have invented certain new and useful Improvements in Driving-Wheels for Harvesters, of which the following is a specification.

The object of my invention is to devise means for adding to the tractional power of lugs formed by the central portions of stirrup-shaped spokes on the tread-face of the driving-wheels of harvesters without unduly enlarging such spokes; and it consists in introducing a strip between the central portion of each spoke and the tread-face of the rim thereof to project the traction-lugs formed by the central portions of such spokes outward sufficiently to obtain the traction required.

Referring to the accompanying drawings, which form a part of this specification, Figure 1 is a top plan view of a harvester driving-wheel, broken, embodying my improvements. Fig. 2 is a central vertical section of the same at the dotted line 2 in Fig. 1. Fig. 3 is a side elevation of the outer end of a stirrup-shaped spoke having its ends passed through holes in a spoke-projecting strip. Fig. 4 is a top plan view of a spoke-projecting strip. Fig. 5 is a section at the dotted line 5 in Fig. 1 of the central portion of a stirrup-shaped spoke, a spoke-projecting strip, and the wheel-rim.

Like letters of reference indicate corresponding parts throughout the several views.

A is a hub provided with outwardly-projecting flanges $A'$ $A^2$, having two series of holes $A^3$ $A^4$ therein to admit the ends of the spokes of the wheel.

B is a wheel-rim concentric with the hub A and having two series of holes $B'$ $B^2$ therein to admit therethrough the radial portions of spokes to be described hereinafter.

C are spoke-projecting strips having holes $C'$ $C^2$ therein corresponding with the two series of holes $B'$ $B^2$ in the wheel-rim B, and having longitudinal channels $C^3$ in the outside faces thereof to form seats for the central portions of spokes to be hereinafter described. The spoke-projecting strips just described are only a preferable form, and obviously the holes $C'$ $C^2$ and channels $C^3$ therein might be omitted therefrom and other forms might be readily substituted therefor without departing from the spirit and scope of my invention.

D are stirrup-shaped spokes consisting of central or horizontal portions $D'$ and radial portions $D^2 D^3$ extending at right angles thereto. The radial portions $D^2 D^3$ of the spokes D are passed through the holes $C' C^2$ in the spoke-projecting strips C, the two series of holes $B' B^2$ in the rim B, and the two series of holes $A^3 A^4$ in the hub-flanges $A' A^2$. Nuts E are then applied to the threaded ends of the radial portions $D^2 D^3$ of the spokes D until the central portions $D'$ thereof enter the seats $C^3$ in the spoke-projecting strips C and tightly clamp them to the tread-face of the wheel-rim B.

Spokes of the species just described are customarily made by bending iron rods, of uniform size throughout, into the form already described and passing the radial portions thereof through apertures in the wheel-rim and securing them by their inner ends to the wheel-hub.

It is highly desirable that rods of the smallest diameter that will furnish the requisite amount of strength be employed in making wheels, both to cheapen the cost of their production and to render them as light as possible.

It has been found in practice that the portions $D'$ of stirrup-shaped spokes that serve as traction-lugs on the tread-face of harvester driving-wheels, while strong enough for every purpose, frequently do not form lugs of sufficient prominence and size to furnish the amount of traction required to operate harvesters provided with such wheels most successfully and satisfactorily. It is for the express purpose of obviating this difficulty in wheels of this kind that I have devised the spoke-projecting strips C in order to furnish traction-lugs of the requisite prominence and size.

I claim—

1. In a driving-wheel, in combination, a hub, a rim concentric therewith and having two series of holes therein, stirrup-shaped spokes having their central portions extending across and parallel to the tread face of the rim and their radial-portions inserted inward through the series of holes therein and secured to the hub, and spoke-projecting strips clamped to the tread face of the rim by means of the central portions of the stirrup-shaped spokes substantially as and for the purpose specified.

2. In a driving-wheel, in combination, a hub having two series of holes therein, a rim concentric therewith and having two series of holes therein, stirrup-shaped spokes having their central portions extending obliquely across and parallel to the tread face of the rim and their radial portions inserted inward, through the series of holes in the rim and hub, and secured to the latter by means of nuts, and spoke-projecting strips located between the tread face of the rim and the central portions of the stirrup-shaped spokes, substantially as and for the purpose specified.

JAMES MACPHAIL.

Witnesses:
L. L. MORRISON,
NELLIE BUNKER.